(12) United States Patent
Bailey et al.

(10) Patent No.: US 8,326,960 B2
(45) Date of Patent: Dec. 4, 2012

(54) WAKE ON LOCAL AREA NETWORK SIGNALLING IN A MULTI-ROOT I/O VIRTUALIZATION

(75) Inventors: Warren D. Bailey, Pittsboro, NC (US); Christopher C. West, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 12/630,694

(22) Filed: Dec. 3, 2009

(65) Prior Publication Data

US 2011/0138044 A1    Jun. 9, 2011

(51) Int. Cl.
    *G06F 15/173* (2006.01)
(52) U.S. Cl. .......................... 709/223; 709/224; 709/225
(58) Field of Classification Search .................. 709/223, 709/224, 225, 221, 220, 217; 713/310; 370/311
    See application file for complete search history.

(56) References Cited

U.S. PATENT DOCUMENTS

| | | |
|---|---|---|
| 5,958,057 A | 9/1999 | Gianni |
| 6,047,378 A | 4/2000 | Garrett et al. |
| 7,251,736 B2 | 7/2007 | Dayan et al. |
| 7,480,265 B2 | 1/2009 | Cromer et al. |
| 7,506,366 B1 | 3/2009 | Sze et al. |
| 2005/0154928 A1 | 7/2005 | Larson et al. |
| 2007/0070998 A1 | 3/2007 | Sethuram et al. |
| 2008/0201710 A1 | 8/2008 | Anderson et al. |
| 2008/0270599 A1 | 10/2008 | Tamir et al. |
| 2008/0313481 A1 | 12/2008 | Paljug |
| 2009/0030970 A1 | 1/2009 | Siegmund |
| 2009/0063878 A1* | 3/2009 | Schmidt et al. ............... 713/310 |
| 2009/0172163 A1 | 7/2009 | Carroll et al. |
| 2009/0210519 A1* | 8/2009 | Zill et al. ....................... 709/220 |
| 2009/0228570 A1* | 9/2009 | Janik et al. .................... 709/217 |
| 2009/0241113 A1 | 9/2009 | Sequin et al. |
| 2009/0276773 A1 | 11/2009 | Brown et al. |
| 2010/0165898 A1* | 7/2010 | Tang et al. .................... 370/311 |
| 2010/0174808 A1* | 7/2010 | Dabagh et al. ................ 709/221 |
| 2010/0257384 A1* | 10/2010 | Tsai et al. ..................... 713/310 |

* cited by examiner

*Primary Examiner* — Le H Luu
(74) *Attorney, Agent, or Firm* — Cynthia G. Seal; Jeffrey L. Streets

(57) ABSTRACT

Wake on local area network (LAN) functionality is provided in a multi-root environment. An I/O device, which is share by a plurality of physical hosts, receives the MAC address contained in the wake up packet, then prepares and sends an appropriate wake signal to the targeted host. In one embodiment, the shared I/O device sends an out-of-band wake up signal to each of the physical host computers, wherein the wake up signal is a serial bit stream encoded with the MAC address so that only the physical host having a MAC address matching the MAC address in the wake up signal will be turned on. In another embodiment, the shared I/O device sends a binary ON/OFF signal directly to the targeted physical host computer over a signal line associated with the MAC address.

15 Claims, 3 Drawing Sheets

WAKE ON LOCAL AREA NETWORK SIGNALLING IN A MULTI-ROOT I/O VIRTUALIZATION

BACKGROUND

1. Field of the Invention

The present invention relates to wake on local area network signaling to a physical host in a multi-root virtualization environment.

2. Background of the Related Art

Many computer systems now have a remote power on function, such as Wake on LAN (Local Area Network) (WOL) technology. WOL is the ability to power on remote computers through the use of special network packets. WOL is based on the principle that when the PC shuts down, the network interface card or LAN adapter still receives power and keeps listening on the network for a special WOL packet to arrive. When the WOL packet is received, the network interface card sends an out-of-band signal to the power supply, which then supplies electrical power to the rest of the computer. Unfortunately, WOL only works with network cards and motherboards that are WOL compliant and is only capable of powering on the entire computer through the power supply.

In a multi-root I/O virtualization environment, a single network interface card services multiple physical hosts. However, there is no defined mechanism for the shared network interface card to signal which physical host should be awakened by the receipt of the network packet. Even though the network packet itself will contain the media access control (MAC) address associated with the physical host to be awakened, the current out of band signaling is done with a single WAKE signal line from the I/O device.

BRIEF SUMMARY

Embodiments of the present invention provide methods and computer program products for implementing wake on LAN in a multi-root I/O environment. In one embodiment, the method comprises a shared I/O device, such as a network interface card, receiving a wake up packet over a local area network, wherein the wake up packet contains a media access control address associated with one of a plurality of physical hosts that share the shared I/O device. The method also comprises the shared I/O device sending an out-of-band wake up signal to each of the physical host computers (root nodes) sharing the I/O device, wherein the wake up signal is a serial bit stream encoded with the media access control address so that only the physical host having a media access control address matching the media access control address in the wake up signal will be turned on.

In another embodiment, a method comprises a shared I/O device receiving a wake up packet over a local area network, wherein the wake up packet contains a media access control address associated with a targeted physical host among a plurality of physical hosts that share the shared I/O device. The method further comprises the shared I/O device accessing a table of media access control addresses that are each associated with a different physical wake up signal line that is directly coupled to one of the plurality of physical hosts. Then, the method comprises the shared I/O device sending a wake up binary ON/OFF signal directly to the targeted physical host computer over the physical wake up signal line associated with the media access control address.

DETAILED DESCRIPTION

Figure 1:
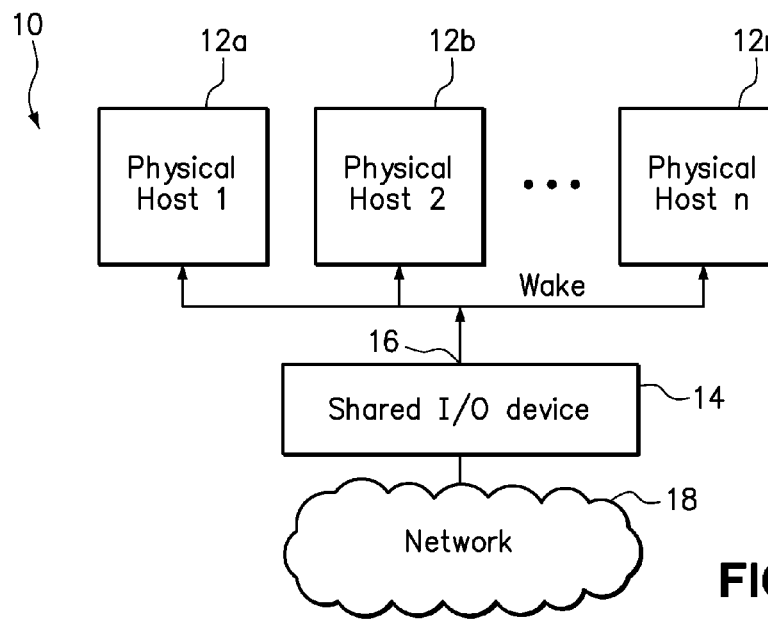
FIG. 1 is a diagram of a system employing multi-root I/O virtualization, such that multiple physical hosts share a common I/O device.

Embodiments of the present invention provide methods and computer program products for implementing wake on LAN in a multi-root I/O environment. In a first embodiment, the method comprises a shared I/O device, such as a network interface card, receiving a wake up packet over a local area network, wherein the wake up packet contains a media access control address associated with one of a plurality of physical hosts that share the shared I/O device. The method also comprises the shared I/O device sending an out-of-band wake up signal to each of the physical host computers (root nodes) sharing the I/O device, wherein the wake up signal is a serial bit stream encoded with the media access control address so that only the physical host having a media access control address matching the media access control address in the wake up signal will be turned on.

The shared I/O device still receives some power even when the physical hosts are turned off in order to listen for and receive the wake up packet over the local area network. The shared I/O device, which may be an Ethernet card, also uses this power to send an out-of-band wake up signal to each of the physical host computers, even though the physical host may be in a D3 cold power state prior to receiving the wake up signal. Optionally, the out-of-band wake up signal may be a serial bit stream that follows an inter-integrated circuit protocol.

Preferably, power control circuitry of each physical host decodes the serial bit stream of the wake up signal to identify the media access control address within the serial bit stream. Accordingly, the power control circuitry of one of the physical hosts will turn on the physical host in response to receiving a wake up signal containing a media access control address that matches the media access control address associated with the physical host. The power control circuitry is typically part of the physical host's power supply, such as a power management controller.

In an alternative second embodiment, a method comprises a shared I/O device receiving a wake up packet over a local area network, wherein the wake up packet contains a media access control address associated with a targeted physical host among a plurality of physical hosts that share the shared I/O device. The method further comprises the shared I/O device accessing a table of media access control addresses that are each associated with a different physical wake up signal line that is directly coupled to one of the plurality of physical hosts. Then, the method comprises the shared I/O device sending a wake up binary ON/OFF signal directly to the targeted physical host computer over the physical wake up signal line associated with the media access control address.

The shared I/O device still receives some power even when the physical hosts are turned off in order to listen for and receive the wake up packet over the local area network. The shared I/O device, which may be an Ethernet card, also uses this power to send an out-of-band wake up signal to the targeted physical host, even though the physical host may be in a D3 cold power state prior to receiving the wake up signal. It is the power control circuitry of the targeted physical host that receives the wake up binary ON/OFF signal from the shared I/O device and turns on the physical host.

The foregoing embodiments of the invention provide WOL in a multi-root environment, even if the physical host is in D3 cold power state (DC off). Each of the foregoing embodiments rely upon the shared I/O device receiving the MAC address contained in the wake up packet and using that information to get an appropriate wake signal to the appropriate host. In the first embodiment, the wake signal is a bit stream, which is encoded with the MAC address of a targeted physical host, that is sent out to all of the physical hosts served by the shared I/O device. This method minimizes the number of physical pins needed to implement the WoL function, but requires additional intelligence in the physical host in order to decode a binary bit stream. In the second embodiment, the wake signal is a binary ON/OFF signal, but the shared I/O device communicates with the targeted physical host over a dedicated wake signal line that is associated with the MAC address received by the share I/O device. This second embodiment requires additional physical pins on the shared I/O device, but does not require additional intelligence in the physical host.

FIG. 1 is a diagram of a system 10 employing multi-root I/O virtualization, such that multiple physical hosts 12a-12n share an I/O device 14, such as an Ethernet network interface card. Although each of the physical hosts 12a-12n would have a data interconnection with the shared I/O device 14, the data interconnections are not shown.

Rather, the wake signal port 16 that exists in current Ethernet ASICs is connected in parallel to each of the physical hosts 12a-12n. After the shared I/O device 14 receives the wake up packet over the network 18, the shared I/O device first extracts the MAC address from the wake up packet. The shared I/O device 14 then encodes the MAC address into a serial bit stream and transmits the serial bit stream over the wake signal lines to the physical hosts 12a-12n. The protocol for the serial bit stream could be the same as is used on existing 12C devices, but the actual protocol on this bit stream is not limited to any one protocol. The physical hosts 12a-12n each have a portion of their power control circuitry active, even when the physical host is in the D3 cold state. Accordingly, the power control circuitry decodes the serial bit stream, identifies the MAC address contained in that serial bit stream, and will only wake the host system to which it is connected if the MAC address is identified as matching the MAC address of that host. The encoded serial bit stream may be transmitted to any one of the physical hosts using an existing wake signal line. The bit stream transmitted from the shared I/O device according to this embodiment of the invention will cause a transition on the wake signal line that will be detected by a conventional host and commence the wake up process.

Figure 2:
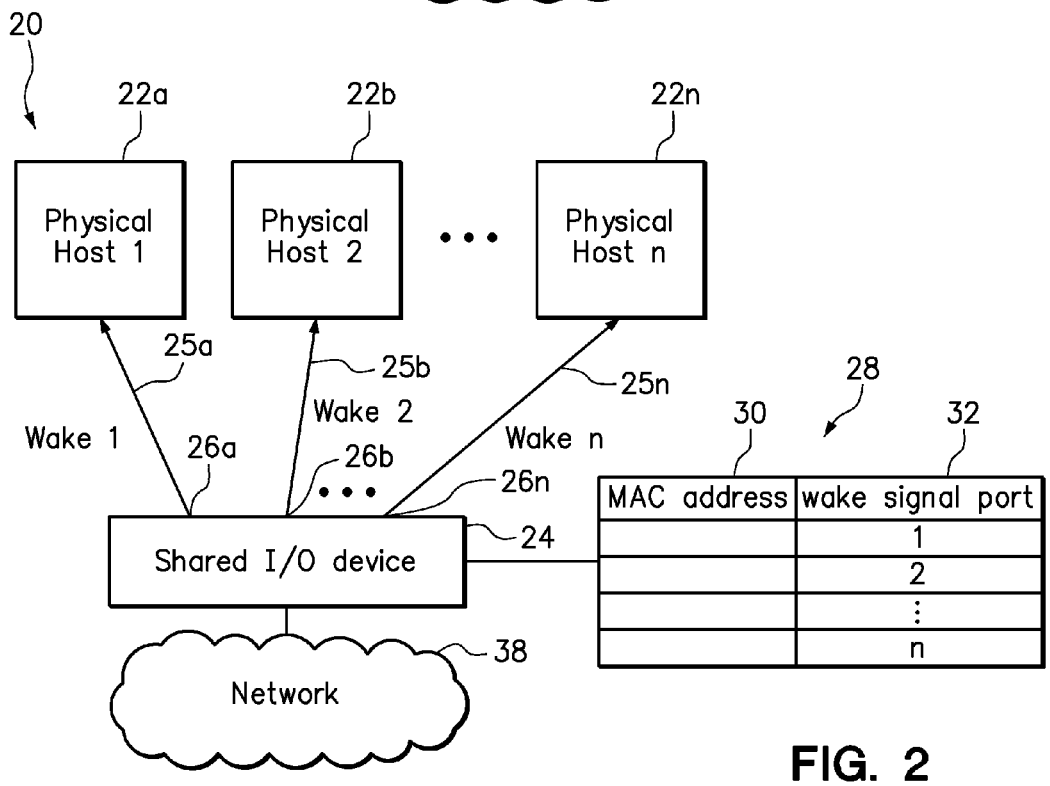
FIG. 2 is a diagram of an alternative system employing multi-root I/O virtualization, where the shared I/O device can send a wake signal to any one of the physical hosts over a separate wake signal line.

FIG. 2 is a diagram of an alternative system 20 employing multi-root I/O virtualization, such that multiple physical hosts 22a-22n share a common I/O device. In this alternative system, a shared I/O device 24 sends a wake signal to any one of the physical hosts 22a-22n over a separate wake signal line 25a-25n coupled to a separate wake signal port 26a-26n. In this embodiment, the shared I/O device 24 maintains a table 28 that maps a given MAC address (column 30) to a wake signal port (column 32). The shared I/O device 24 receives a wake up packet over the network 38 and extracts the MAC address from the wake up packet. Next, the shared I/O device looks up the extracted MAC address in the table 28, and then sends out a binary wake signal on the wake signal port corresponding to that MAC address. The wake signal port is coupled to the appropriate physical host over a dedicated wake signal line. This embodiment implements WOL using multiple wake signal lines on the shared I/O device, but does not require that the wake signal be redefined to a serial bit interface. Accordingly, this embodiment is backwards compatible to the existing WOL definitions between a single I/O device and a single host.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
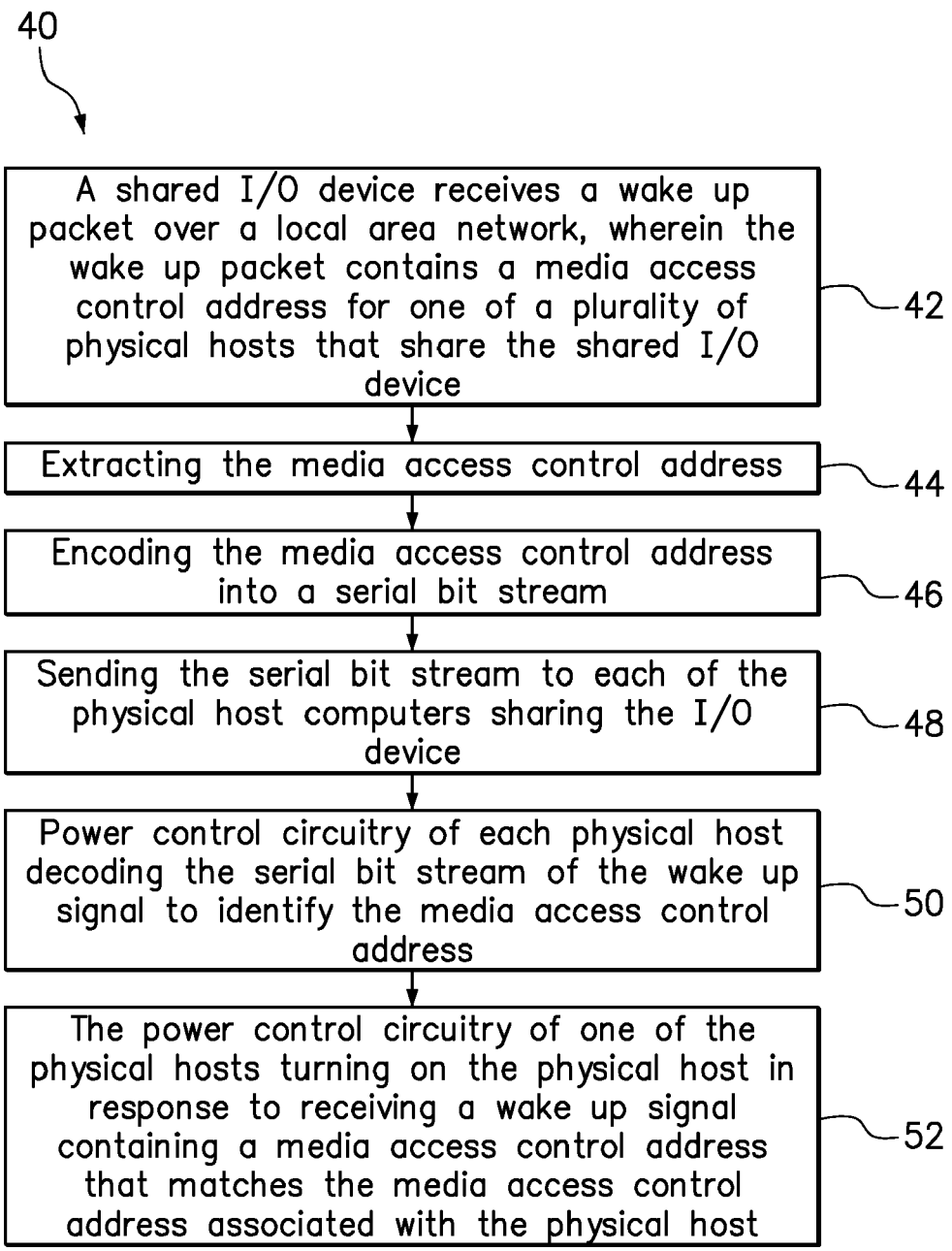
FIG. 3 is a flowchart of a first method of providing WOL in a system having multi-root I/O virtualization.

FIG. 3 is a flowchart of a first method 40 of providing WOL in a system having multi-root I/O virtualization. In step 42, a shared I/O device receives a wake up packet over a local area network, wherein the wake up packet contains a media access control address for one of a plurality of physical hosts that share the shared I/O device. In step 44, the shared I/O device extracts the media access control address from the wake up packet, and then encodes the media access control address into a serial bit stream in step 46. Next, the shared I/O device sends the serial bit stream to each of the physical host computers sharing the I/O device in step 48. In accordance with a preferred embodiment, the power control circuitry of each physical host then decodes the serial bit stream of the wake up signal to identify the media access control address in step 50. Finally, in step 52, the power control circuitry of one of the physical hosts turns on the physical host in response to receiving a wake up signal containing a media access control address that matches the media access control address associated with the physical host.

Figure 4:
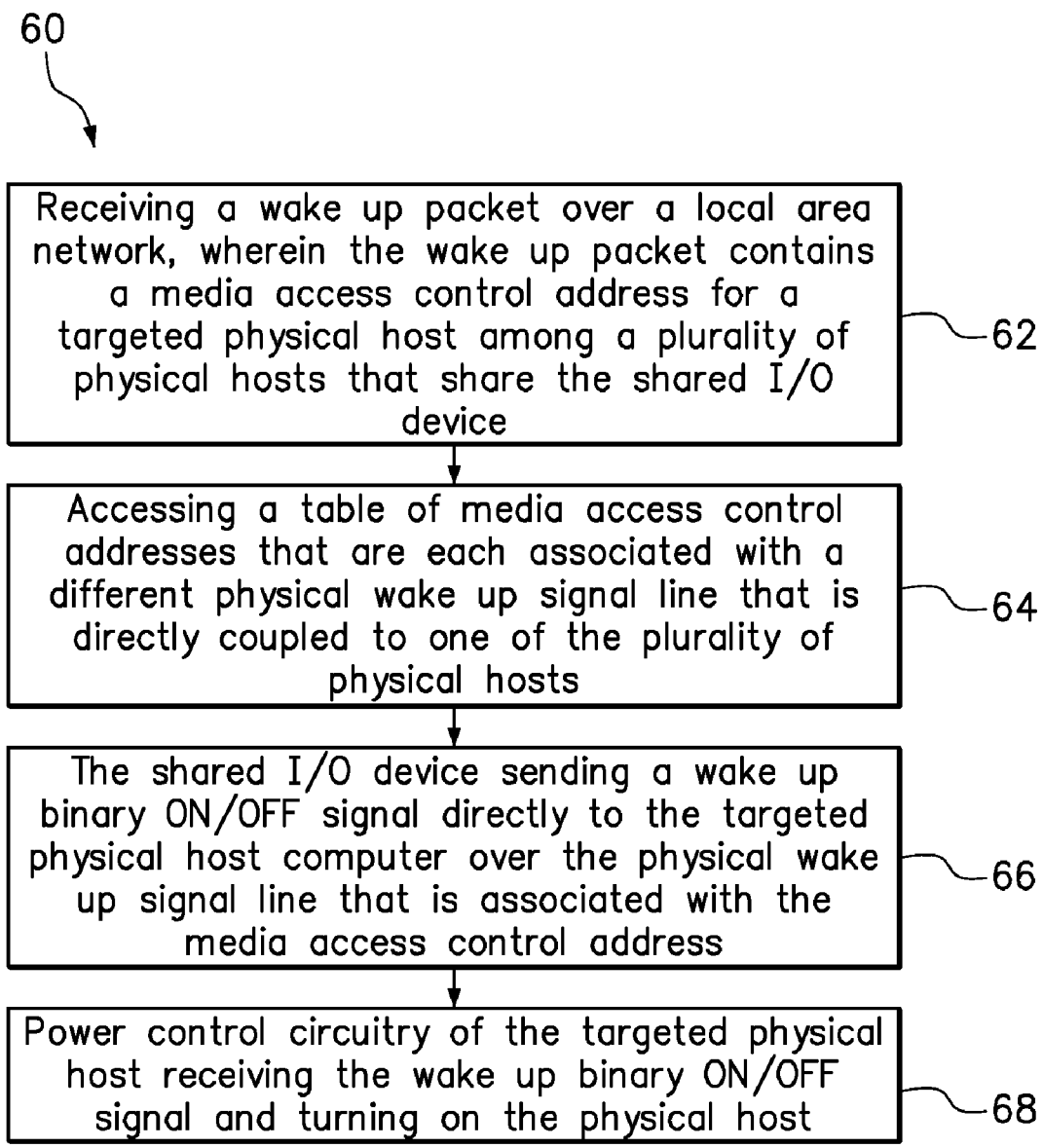
FIG. 4 is a flowchart of a second method of providing WOL in a system having multi-root I/O virtualization.

FIG. 4 is a flowchart of a second method 60 of providing WOL in a system having multi-root I/O virtualization. In step 62, a shared I/O device receives a wake up packet over a local area network, wherein the wake up packet contains a media access control address for a targeted physical host among a plurality of physical hosts that share the shared I/O device. In step 64, the shared I/O device accesses a table of media access control addresses that are each associated with a different physical wake up signal line that is directly coupled to one of the plurality of physical hosts. Step 66 includes the shared I/O device sending a wake up binary ON/OFF signal directly to the targeted physical host computer over the physical wake up signal line that is associated with the media access control address. According to a preferred embodiment, step 68 further provides that power control circuitry of the targeted physical host receives the wake up binary ON/OFF signal and turns on the physical host.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   a shared I/O device receiving a wake up packet over a local area network, wherein the wake up packet contains a media access control address for one of a plurality of physical hosts that share the shared I/O device; and the shared I/O device sending an out of band wake up signal to each of the physical host computers (root nodes) sharing the I/O device, wherein the wake up signal is a serial bit stream encoded with the media access control address so that only the physical host having a media access control address matching the media access control address in the wake up signal will be turned on.

2. The method of claim 1, wherein the physical host is in a D3 cold power state prior to receiving the wake up signal.

3. The method of claim 1, wherein the shared I/O device is an Ethernet card.

4. The method of claim 1, wherein the serial bit stream follows an inter-integrated circuit protocol.

5. The method of claim 1, further comprising:
power control circuitry of each physical host decoding the serial bit stream of the wake up signal to identify the media access control address within the serial bit stream; and
the power control circuitry of one of the physical hosts turning on the physical host in response to receiving a wake up signal containing a media access control address that matches the media access control address associated with the physical host.

6. A computer program product including computer usable program code embodied on a computer usable storage medium for implementing a wake on local area network function in a multi-root I/O virtualization environment, the computer program product including:
computer usable program code for a shared I/O device receiving a wake up packet over a local area network, wherein the wake up packet contains a media access control address for one of a plurality of physical hosts that share the shared I/O device; and
computer usable program code for the shared I/O device sending an out of band wake up signal to each of the physical host computers (root nodes) sharing the I/O device, wherein the wake up signal is a serial bit stream encoded with the media access control address so that only the physical host having a media access control address matching the media access control address in the wake up signal will be turned on.

7. The computer program product of claim 6, wherein the shared I/O device is an Ethernet card.

8. The computer program product of claim 6, further comprising:
computer usable program code for encoding the serial bit stream according to an inter-integrated circuit protocol.

9. A method comprising:
a shared I/O device receiving a wake up packet over a local area network, wherein the wake up packet contains a media access control address for a targeted physical host among a plurality of physical hosts that share the shared I/O device;
the shared I/O device accessing a table of media access control addresses that are each associated with a different physical wake up signal line that is directly coupled to one of the plurality of physical hosts; and
the shared I/O device sending a wake up binary ON/OFF signal directly to the targeted physical host computer over the physical wake up signal line associated with the media access control address.

10. The method of claim 9, wherein the physical host is in a D3 cold power state prior to receiving the wake up signal.

11. The method of claim 9, wherein the serial bit stream follows an inter-integrated circuit protocol.

12. The method of claim 9, further comprising:
power control circuitry of the targeted physical host receiving the wake up binary ON/OFF signal and turning on the physical host.

13. A computer program product including computer usable program code embodied on a computer usable storage medium for implementing a wake on local area network function in a multi-root I/O virtualization environment, the computer program product including:
computer usable program code for a shared I/O device receiving a wake up packet over a local area network, wherein the wake up packet contains a media access control address for a targeted physical host among a plurality of physical hosts that share the shared I/O device;
computer usable program code for the shared I/O device accessing a table of media access control addresses that are each associated with a different physical wake up signal line that is directly coupled to one of the plurality of physical hosts; and
computer usable program code for the shared I/O device sending a wake up binary ON/OFF signal directly to the targeted physical host computer over the physical wake up signal line associated with the media access control address.

14. The computer program product of claim 13, wherein the shared I/O device is an Ethernet card.

15. The computer program product of claim 13, further comprising:
computer usable program code for power control circuitry of the targeted physical host receiving the wake up binary ON/OFF signal and turning on the physical host.

* * * * *